(12) United States Patent
Wei et al.

(10) Patent No.: US 12,401,549 B2
(45) Date of Patent: Aug. 26, 2025

(54) DOWNLINK CHANNEL STATE INFORMATION ESTIMATION METHOD AND APPARATUS, DEVICE, AND STORAGE MEDIUM

(71) Applicant: ZTE CORPORATION, Guangdong (CN)

(72) Inventors: Ning Wei, Guangdong (CN); Guanghui Yu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 394 days.

(21) Appl. No.: 17/795,700

(22) PCT Filed: Feb. 20, 2021

(86) PCT No.: PCT/CN2021/077083
§ 371 (c)(1),
(2) Date: Jul. 27, 2022

(87) PCT Pub. No.: WO2021/232868
PCT Pub. Date: Nov. 25, 2021

(65) Prior Publication Data
US 2023/0055509 A1     Feb. 23, 2023

(30) Foreign Application Priority Data
May 18, 2020  (CN) .................. 202010420856.X (51) Int. Cl.
*H04L 25/02* (2006.01)
*H04B 7/06* (2006.01)
(52) U.S. Cl.
CPC ....... *H04L 25/0228* (2013.01); *H04B 7/0626* (2013.01); *H04L 25/024* (2013.01)

(58) Field of Classification Search
CPC . H04L 25/0228; H04L 25/024; H04L 25/022; H04L 25/0224; H04B 7/0626
See application file for complete search history.

(56) References Cited

U.S. PATENT DOCUMENTS

| 2003/0092456 A1* | 5/2003 | Dent ................... H04B 7/0615 455/503 |
| 2007/0206691 A1 | 9/2007 | You et al. |

(Continued)

FOREIGN PATENT DOCUMENTS

| CN | 105453678 A | 3/2016 |
| CN | 105634658 A | 6/2016 |

(Continued)

OTHER PUBLICATIONS

Office Action and Search Report, dated May 1, 2024; Chinese Patent Application No. 202010420856.X; 6 pages.

(Continued)

*Primary Examiner* — Steven Hieu D Nguyen
(74) *Attorney, Agent, or Firm* — McDonald Hopkins LLC (57) ABSTRACT

Provided are a downlink channel state information estimation method and apparatus, a device, and a storage medium. The downlink channel state information estimation method includes sending a downlink radio frame carrying channel sounding information; receiving an uplink radio frame carrying a first downlink channel state information data set; acquiring an uplink channel state information data set; and determining a second downlink channel state information data set.

10 Claims, 4 Drawing Sheets

(56) References Cited

U.S. PATENT DOCUMENTS

| | | | |
|---|---|---|---|
| 2008/0182543 A1* | 7/2008 | Yang | H04B 1/1027 |
| | | | 455/296 |
| 2010/0260060 A1* | 10/2010 | Abraham | H04W 28/18 |
| | | | 370/252 |
| 2014/0119325 A1* | 5/2014 | Xia | H04L 5/0035 |
| | | | 370/329 |
| 2016/0112108 A1* | 4/2016 | Wu | H04W 24/08 |
| | | | 370/252 |
| 2017/0279505 A1 | 9/2017 | Zhang et al. | |
| 2018/0091207 A1* | 3/2018 | Kakishima | H04L 25/03343 |
| 2018/0176042 A1 | 6/2018 | Lie et al. | |
| 2019/0166514 A1* | 5/2019 | Liu | H04L 5/0057 |
| 2020/0067573 A1* | 2/2020 | Kuchi | H04L 5/0053 |
| 2020/0259545 A1* | 8/2020 | Bai | H04W 72/046 |

FOREIGN PATENT DOCUMENTS

| | | |
|---|---|---|
| CN | 109120565 A | 1/2019 |
| CN | 111147212 A | 5/2020 |
| CN | 111901259 A | 11/2020 |
| WO | WO-2012130313 A1 * 10/2012 | ........... H04B 7/0626 |
| WO | WO-2016093745 A1 * 6/2016 | ........... H04B 17/336 |

OTHER PUBLICATIONS

International Search Report mailed May 25, 2021; International Patent Application No. PCT/CN2021/077083 filed Feb. 20, 2021. ISA/CN.

European Supplementary Search Report for Application 21807979, PCT/CN2021/077083, dated Apr. 29, 2024, 2 pgs., European Patent Office, Germany.

State Intellectual Property Office of People's Republic of China, Notification of Second Office Action for Application No. 202010420856, report issue date Aug. 20, 2024, China.

State Intellectual Property Office of People's Republic of China, Search Report for Application No. 202010420856, report issue date Aug. 14, 2024, China.

* cited by examiner

DOWNLINK CHANNEL STATE INFORMATION ESTIMATION METHOD AND APPARATUS, DEVICE, AND STORAGE MEDIUM

CROSS-REFERENCES TO RELATED APPLICATIONS

This application is a national stage application filed under 35 U.S.C. 371 based on International Patent Application No. PCT/CN2021/077083, filed on Feb. 20, 2021, which claims priority to Chinese Patent Application No. 202010420856.X filed with the CNIPA on May 18, 2020, disclosures of which are incorporated herein by reference in their entireties.

TECHNICAL FIELD

The present application relates to the field of wireless communication networks, for example, a downlink channel state information estimation method and apparatus, a device, and a storage medium.

BACKGROUND

Millimeter wave and massive multiple-input multiple-output (MIMO) technology provides a high system transmission capacity for a Frequency Division Duplex (FDD) system, and, meanwhile, it brings an excessive downlink channel state information feedback burden. Paradoxically, the excessive feedback burden inhibits the increase of the system capacity. The uplink and downlink channel reciprocity, that is, uplink channel state information equivalent to downlink channel state information, is a conventional method for eliminating the high feedback burden. However, the frequency difference between uplink and downlink channels makes it unable to be directly used by the FDD system.

SUMMARY

The present application provides a downlink channel state information estimation method and apparatus, a device, and a storage medium.

An embodiment of the present application provides a downlink channel state information estimation method, being applied to a control node. The method includes the following.

A downlink radio frame carrying channel sounding information is sent; an uplink radio frame carrying a first downlink channel state information data set is received; an uplink channel state information data set is acquired; and a second downlink channel state information data set is determined.

An embodiment of the present application provides a downlink channel state information estimation method, being applied to a user equipment. The method includes the following.

A downlink radio frame carrying channel sounding information is received; a first downlink channel state information data set is determined; and an uplink radio frame carrying the first downlink channel state information data set is fed back.

An embodiment of the present application further provides a downlink channel state information estimation apparatus applied to a control node. The apparatus includes a sounding sending module, an information receiving module, an information estimation module, and a range estimation module.

The sounding sending module is configured to send a downlink radio frame carrying channel sounding information. The information receiving module is configured to receive an uplink radio frame carrying a first downlink channel state information data set. The information estimation module is configured to acquire an uplink channel state information data set. The range estimation module is configured to determine a second downlink channel state information data set.

An embodiment of the present application provides a downlink channel state information estimation apparatus applied to a user equipment. The apparatus includes a sounding receiving module, an information determination module, and an information feedback module.

The sounding receiving module is configured to receive a downlink radio frame carrying channel sounding information. The information determination module is configured to determine a first downlink channel state information data set. The information feedback module is configured to feed back an uplink radio frame carrying the first downlink channel state information data set.

An embodiment of the present application further provides a device. The device includes one or more processors and a memory configured to store one or more programs.

When executed by the one or more processors, the one or more programs cause the one or more processors to perform the downlink channel state information estimation method according to any embodiment of the present application.

An embodiment of the present application further provides a computer-readable storage medium, which is configured to store a computer program which, when executed by a processor, implements the downlink channel state information estimation method according to any embodiment of the present application.

In embodiments of the present application, the downlink radio frame carrying the channel sounding information is sent to the user equipment, the uplink radio frame including the first downlink channel state information data set is received, the uplink channel state information data set is acquired, and the second downlink channel state information data set is determined so that the downlink channel state information estimation in the Frequency Division Duplex (FDD) system is achieved and the feedback amount of the downlink channel state information is reduced, thereby reducing the feedback burden of the system.

DETAILED DESCRIPTION

Embodiments of the present application are described below in conjunction with drawings.

In the FDD system, although the frequency response reciprocity does not hold, the strong correlation of propagation paths between uplink and downlink channels makes the impulse response reciprocity hold. That is to say, if a base station can calculate a corresponding impulse response through uplink channel state information, then downlink channel state information may also be obtained. To overcome the uncertainty in the actual application process, a user first needs to feed back a small amount of downlink channel state information to the base station. Then, the base station determines the downlink channel state information that has not been fed back under common constraints of the fed back downlink channel state information and the known uplink channel state information. Finally, a feedback burden is alleviated through the change of feedback requirements.

Figure 1:
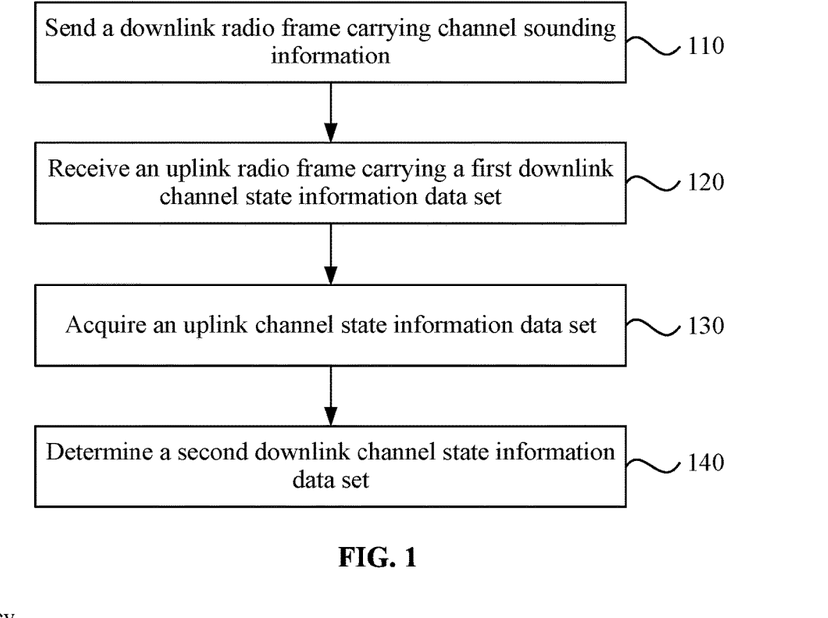
FIG. 1 is a flowchart of a downlink channel state information estimation method according to an embodiment of the present application.

FIG. 1 is a flowchart of a downlink channel state information estimation method according to an embodiment of the present application. The embodiment of the present application may be applicable to a case of estimating downlink channel state information in the FDD system. The method may be performed by a downlink channel state information estimation apparatus in an embodiment of the present application. The apparatus may be implemented by software and/or hardware and is generally integrated in a control node. The control node may be a wireless equipment for controlling a user equipment, where the wireless equipment includes the base station and an access point. The method in the embodiment of the present application includes the following.

In 110, a downlink radio frame carrying channel sounding information is sent.

The channel sounding information is a predefined sequence on a predetermined transmission resource. A medium carrying the channel sounding information is the downlink radio frame used for sounding downlink channel state information, and the channel sounding information is delivered from the control node to the user equipment through the downlink radio frame.

The channel sounding information is a predefined sequence distributed on a predetermined transmission resource.

The predefined sequence is a sequence of symbols with a specific meaning, and a receiver and a sender may pre-agree on the meaning of the predefined sequence before transmission. Exemplarily, the predefined sequence consists of three symbols $\{-1, 0, 1\}$, and a predefined sequence may be $\{1\ 1\ -1\ -1\ 1\ 1\ -1\ 1\ -1\ 1\ 1\ 1\ 1\ 1\ 1\ -1\ -1\ 1\ 1\ -1\ 1\ -1\ 1\ -1\ 1\ 1\ 1\ 1\ 0\ 1\ -1\ -1\ -1\ 1\ 1\ -1\ 1\ -1\ 1\ -1\ -1\ -1\ -1\ -1\ 1\ 1\ -1\ -1\ 1\ 1\ -1\ 1\ 1\ 1\ 1\}$.

In the embodiment of the present application, the predefined sequence includes at least one of a channel state reference signal or a demodulation reference signal.

Based on the preceding embodiment of the present application, the transmission resource includes at least one of time resource, frequency resource, space resource, power resource, or codeword resource.

Figure 2:
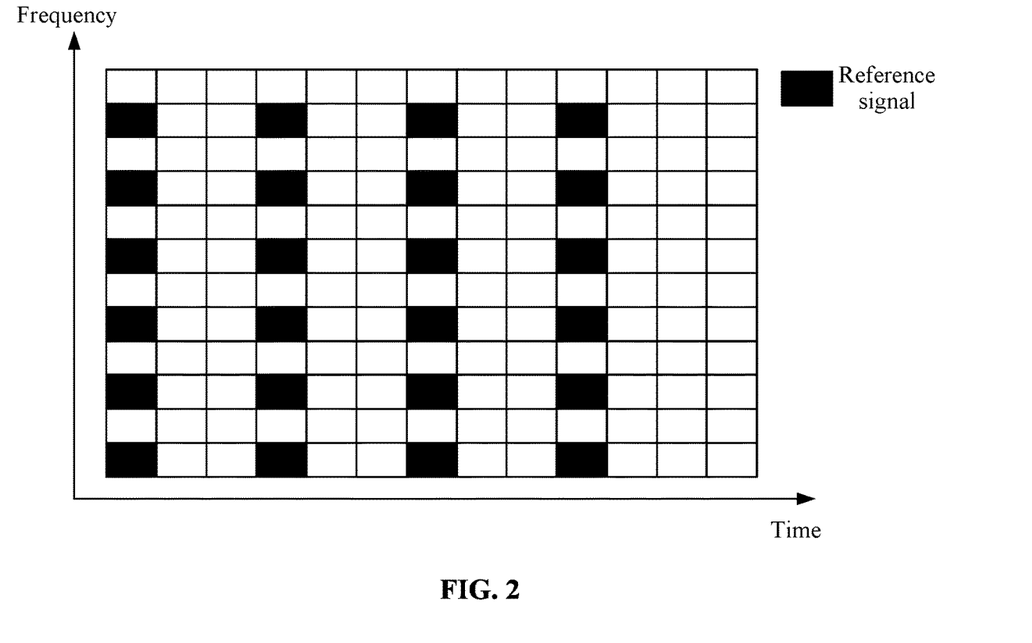
FIG. 2 is an example diagram of time-frequency distribution of a channel state reference signal according to an embodiment of the present application.

Exemplarily, FIG. 2 is an example diagram of time-frequency distribution of a channel state reference signal according to an embodiment of the present application, and channel state reference information sent by the base station at a predetermined time interval and frequency interval is shown in FIG. 2.

In 120, an uplink radio frame carrying a first downlink channel state information data set is received.

The uplink radio frame is radio frame information sent by the user equipment to the control node and includes the downlink channel state information. The downlink channel state information includes a channel frequency response.

In an exemplary embodiment, after sending the downlink radio frame carrying the channel sounding information, the control node may monitor the uplink radio frame sent by the user equipment and acquire the first downlink channel state information data set in the uplink radio frame. The first downlink channel state information data set is composed of channel state information of some downlink subcarriers.

In 130, an uplink channel state information data set is acquired.

In the embodiment of the present application, the uplink channel state information data set is obtained by estimating the uplink radio frame.

In another exemplary embodiment, the uplink channel state information data set is formed using stored historical values of an uplink channel state.

In the embodiment of the present application, 120 and 130 are only used for distinguishing and are not used for limiting the sequence of execution. 130 may be performed before 120, and 120 and 130 may also be performed simultaneously.

In 140, a second downlink channel state information data set is determined.

A downlink subcarrier corresponding to the second downlink channel state information data set is different from a downlink subcarrier corresponding to the first downlink channel state information data set.

In the embodiment of the present application, the second downlink channel state information data set is determined by using the uplink channel state information data set and the first downlink channel state information data set.

In an exemplary embodiment, parameters such as a propagation delay and an attenuation coefficient of a propagation path are estimated based on the uplink channel state information data set; the estimated parameters such as the propagation delay and the attenuation coefficient are corrected using the first downlink channel state information data set fed back by the user equipment; and the second downlink channel state information data set is calculated using the corrected parameters. In this embodiment, the first downlink channel state information data set includes channel state information of an estimating subcarrier and an unwrapping subcarrier. The first downlink channel state information data set fed back by the user equipment to the control node includes two parts of channel state information: channel state information of the estimating subcarrier and channel state information of the unwrapping subcarrier. The channel state information of the estimating subcarrier is used for calculating basic values of parameters such as the propagation delay and the attenuation coefficient of the propagation path within a basic period, where the basic period refers to $[0,2\pi]$. The channel state information of the unwrapping subcarrier is used for filtering out parameter items that satisfy requirements in a set generated by the parameter basic values within a range of multiple basic periods. The multiple basic periods refer to $[-2j\pi,0]\cup[2\pi,2k\pi]$, where k and j are integers greater than 1 and 0, respectively. Based on the preceding embodiment of the present application, the estimating subcarrier and the unwrapping subcarrier are randomly distributed in a frequency range where the downlink channel is located.

In another exemplary embodiment, parameters such as the propagation delay and the attenuation coefficient of the propagation path are jointly estimated using the first downlink channel state information data set and the uplink channel state information data set; and the second downlink channel state information data set is calculated using the jointly estimated parameters.

Based on the preceding embodiment of the present application, the number of estimating subcarriers is determined by the number of propagation paths in the downlink channel.

Based on the preceding embodiment of the present application, the number of unwrapping subcarriers is determined by a delay search interval.

In the embodiment of the present application, the delay search interval may be determined by the control node, and the predetermined delay search interval is sent to the user equipment. The delay search interval may also be determined by the user equipment, and the predetermined delay search interval is sent to the control node.

Figure 3:
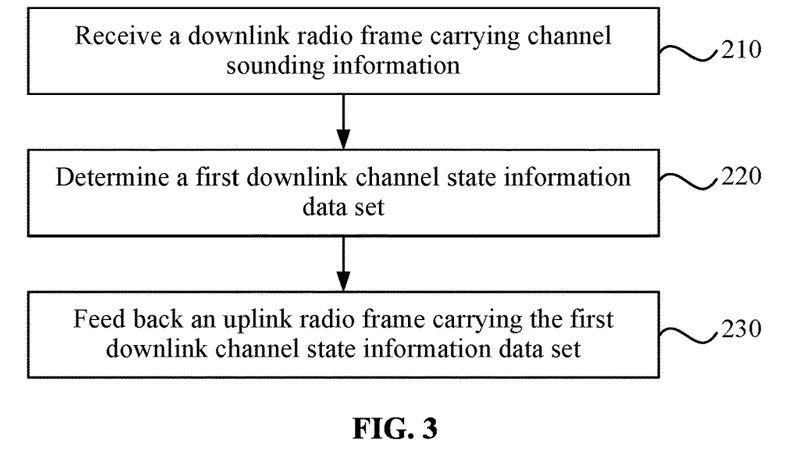
FIG. 3 is a flowchart of a downlink channel state information estimation method according to an embodiment of the present application.

FIG. 3 is a flowchart of a downlink channel state information estimation method according to an embodiment of the present application. The embodiment of the present application may be applicable to a case of estimating downlink channel state information in the FDD system. The method may be performed by a downlink channel state information estimation apparatus in an embodiment of the present application. The apparatus may be implemented by software and/or hardware and is generally integrated in a user equipment. The method in the embodiment of the present application includes the following.

In 210, a downlink radio frame carrying channel sounding information is received.

The user equipment receives the downlink radio frame delivered by the control node, where the downlink radio frame includes the channel sounding information. The channel sounding information may be a channel state reference signal and/or a demodulation reference signal, and the channel sounding information may be used for detecting the downlink channel state so as to acquire a channel frequency response from the control node to the user equipment.

Based on the preceding embodiment of the present application, the channel sounding information is a predefined sequence distributed on a predetermined transmission resource.

In 220, a first downlink channel state information data set is determined.

The first downlink channel state information data set is a data set composed of downlink channel state information.

In the embodiment of the present application, the user equipment may randomly select a downlink subcarrier, acquire channel state information corresponding to the downlink subcarrier, and use the acquired channel state information of the downlink subcarrier as the first downlink channel state information data set.

Based on the preceding embodiment of the present application, the first downlink channel state information data set includes channel state information of an estimating subcarrier and an unwrapping subcarrier.

In 230, an uplink radio frame carrying the first downlink channel state information data set is fed back.

The user equipment sends the first downlink channel state information data to the control node through the uplink radio frame.

In the embodiment of the present application, a downlink radio frame carrying channel sounding information is received; a downlink channel state information data set is determined; and an uplink radio frame carrying the downlink channel state information data set is fed back.

Based on the preceding embodiment of the present application, determining the downlink channel state information includes the following.

A propagation delay and an attenuation coefficient of a propagation path are estimated according to downlink channel frequency response.

The user equipment acquires frequency response of a downlink wireless channel and calculates the propagation delay and the attenuation coefficient of the corresponding propagation path according to the frequency response.

Based on the preceding embodiment of the present application, the number of estimating subcarriers is determined by the number of propagation paths in the channel.

In the embodiment of the present application, in the case where the first downlink channel state information data set is determined, the number of pieces of channel state information of the estimating subcarriers in the first downlink channel state information data set corresponds to the number of propagation paths. For example, the number of the estimating subcarriers is equal to the number of propagation paths. In the downlink channel, a subcarrier index and/or a subcarrier position are randomly selected so as to select the estimating subcarrier, and the corresponding channel state information is stored in the first downlink channel state information data set.

Based on the preceding embodiment of the present application, the number of unwrapping subcarriers is determined by a delay search interval.

The user equipment determines the number of unwrapping subcarriers based on the delay search interval. Generally, the larger the delay search interval is, the greater the number of selected unwrapping subcarriers is, where the delay search interval may be determined by the control node and sent by the control node to the user equipment. The unwrapping subcarrier in the first downlink channel state information data set is obtained by randomly selecting the subcarrier index and/or the subcarrier position.

Figure 4:
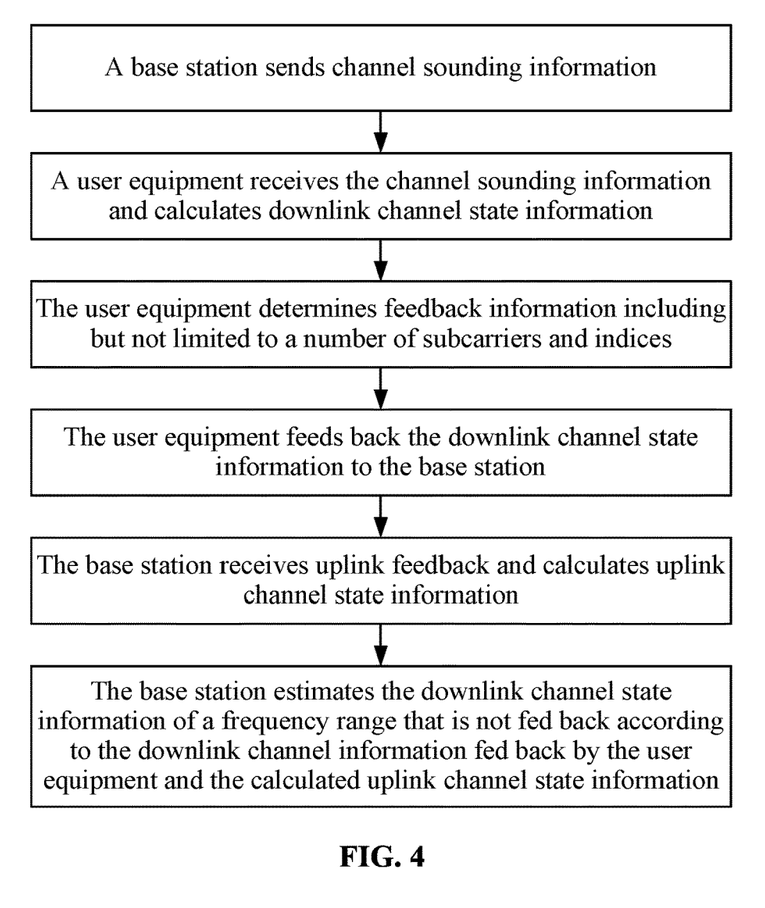
FIG. 4 is an example diagram of a downlink channel state information estimation method according to an embodiment of the present application.
Figure 5:
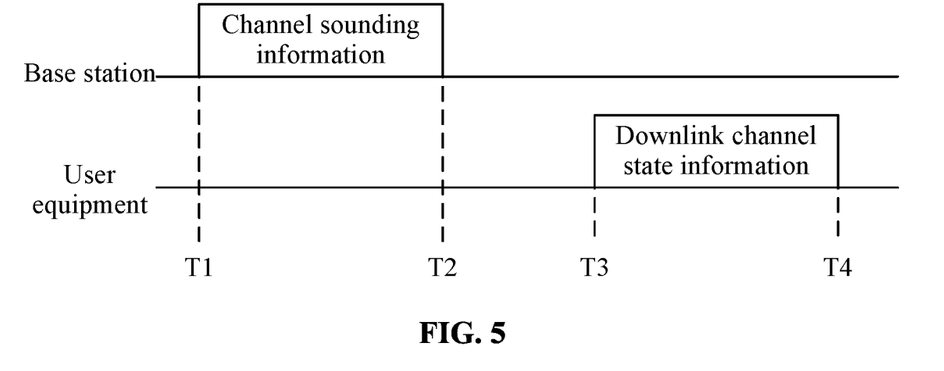
FIG. 5 is an example diagram of frame sequence interaction of a downlink channel state information estimation method according to an embodiment of the present application.

In an exemplary implementation, FIG. 4 is an example diagram of a downlink channel state information estimation method according to an embodiment of the present application. Referring to FIG. 4, in the FDD system, a base station sends a downlink radio frame carrying channel sounding information to a user terminal, and the user equipment acquires downlink channel state information according to the downlink radio frame. The user equipment sends an uplink radio frame carrying the downlink channel state information to the base station on the corresponding uplink transmission resource. After receiving the uplink radio frame sent by the user, the base station estimates the uplink channel state information and then calculates the channel state information of downlink subcarriers other than the known fed back downlink subcarrier under the constraint of the fed back downlink channel state information. Referring to FIG. 5, information exchange is implemented between the base station and the user equipment through the downlink radio frame carrying the channel sounding information and the uplink radio frame carrying the downlink channel state information.

In an exemplary embodiment, assuming that M propagation paths of the channel exist, according to a delay tapped model and a Fourier transform, a relationship between the channel frequency response and the propagation paths may be described as below.

$$H(f) = \sum_{m=1}^{M} A_m e^{-j2\pi f \tau_m} \tag{1}$$

Variables $A_m$ and $\tau_m$ denote the attenuation coefficient and the propagation delay of the propagation path, respectively. If estimation values $\hat{A}_m$ and $\hat{\tau}_m$ of the variables $A_m$ and $\hat{\tau}_m$ are put into formula (1), the corresponding channel frequency response is expressed as below.

$$\hat{H}(f) = \sum_{m=1}^{M} \hat{A}_m e^{-j2\pi f \hat{\tau}_m} = \sum_{m=1}^{M} \hat{A}_m e^{-j2\pi f(\tau_m + \Delta \tau_m)} \tag{2}$$

$\Delta\tau_m$ denotes an estimation error of the propagation delay of the m-th propagation path.

On the premise that an estimation error of the attenuation coefficient is negligible, formula (1) may be rewritten as below.

$$H(f) = \sum_{m=1}^{M} \hat{A}_m e^{-j2\pi f \hat{\tau}_m} e^{j2\pi f \Delta \tau_m} \tag{3}$$

$$= \sum_{m=1}^{M} H'(f, \hat{\tau}_m) e^{j2\pi f \Delta \tau_m}$$

In the formula, $H'(f,\hat{\tau}_m) = \hat{A}_m e^{-j2\pi f \hat{\tau}_m}$.

If the frequency responses corresponding to V downlink subcarriers are known, a nonlinear problem about a delay error $\Delta\tau'_m$ in a basic period $[0,2\pi]$ of an exponential function may be formulated as below.

$$\min \sum_{v=1}^{V} H(f_v) - \sum_{m=1}^{M} H'(f_v, \hat{\tau}_m) e^{j2\pi f_v \Delta \tau'_{v,m}} \tag{4}$$

$$\text{s.t. } 0 \le \Delta\tau'_{v,m} < \max\left\{\frac{1}{f_v}\right\}_{v=1}^{V}, \Delta\tau'_{v,m} = \Delta\tau'_{1,m} + \psi(f_1, f_v)$$

$\psi(f_a, f_b)$ denotes a difference between delay estimation errors $\Delta\tau'_m$ two different frequencies; and in the case where M is unknown, a value of M is replaced by the estimation value.

To reduce the uncertainty of the solution, the number V of estimating subcarriers is set equal to the number M of propagation paths. In the case where V=M, a coefficient matrix H'(f) formed by the estimating subcarriers is denoted as below.

$$H'(f) = \begin{bmatrix} \hat{A}_1 e^{-j2\pi f_1 \hat{\tau}_1} & \hat{A}_2 e^{-j2\pi f_1 \hat{\tau}_2} & \cdots & \hat{A}_M e^{-j2\pi f_1 \hat{\tau}_M} \\ \hat{A}_1 e^{-j2\pi f_2 \hat{\tau}_1} & \hat{A}_2 e^{-j2\pi f_2 \hat{\tau}_2} & \cdots & \hat{A}_M e^{-j2\pi f_2 \hat{\tau}_M} \\ \vdots & \vdots & \ddots & \vdots \\ \hat{A}_1 e^{-j2\pi f_M \hat{\tau}_1} & \hat{A}_2 e^{-j2\pi f_M \hat{\tau}_2} & \cdots & \hat{A}_M e^{-j2\pi f_M \hat{\tau}_M} \end{bmatrix} \tag{5}$$

Since a necessary condition for the existence of a unique solution to the estimation error of the propagation delay is that the matrix H'(f) is full rank, the adjacent estimating subcarriers should make no correlation exist between rows of the matrix H'(f) or minimize the correlation between the rows of the matrix H'(f) in the case where an estimated delay is unknown. In an embodiment, M integers may be randomly selected within an interval [Q, U] as position indices of the estimating subcarriers, where Q and U denote lower and upper bounds of the downlink subcarrier indices, respectively. Optionally, a random seed for selecting downlink subcarriers may be determined by the base station, and the user equipment is notified during a feedback process or before a feedback operation is performed.

Since a space formed by a product of the delay estimation error and the frequency is usually $[-2j\pi,0] \cup [2\pi,2k\pi]$, where k and j are integers greater than 1 and 0, respectively, the user needs to feed back new subcarriers (named as unwrapping subcarriers in the present application) and corresponding frequency responses $H(f_n)$ where $f_n \ne f_v$, so as to reduce the uncertainty of the solution caused by periodicity. An optimization problem corresponding to this idea may be described below.

$$\min \sum_{n=1}^{N} H(f_n) - \sum_{m=1}^{M} \sum_{i=1}^{I} H'(f_n, \hat{\tau}_m) e^{j2\pi f_n \Delta \tau''_{i,m}} \tag{6}$$

$$\text{s.t. } f_n \ne f_v, \Delta\tau''_{i,m} = \Delta\tau'_{1,m} + \frac{Z\{i\}}{\max\{f_v\}_{v=1}^{V}}$$

A symbol Z denotes a set of integers, which consists of I integers; and the number N of unwrapping subcarriers is a function of the numbers M and I of propagation paths, that is, $N=\Phi(M,I)$. Optionally, the size of I may be determined by the base station or determined by the user equipment according to the downlink state information. In an embodiment, N integers may be randomly selected within the interval [Q, U] as indices of the unwrapping subcarriers. Q and U denote lower and upper bounds of the downlink subcarrier indices, respectively; and indices of the unwrapping subcarriers are different from indices of the estimating subcarriers. Optionally, the base station determines the random seed and notifies the user during the feedback process or before the feedback operation is performed. The base station calculates the estimation error of the propagation delay through formula (6).

If the estimation error of the attenuation coefficient cannot be ignored, after the estimation error $\hat{\tau}'_m$ of the delay is calculated using the estimate $\hat{A}_m$ of the attenuation coefficient, the attenuation coefficient is corrected by formula (7):

$$\hat{A}'_m = \operatorname{argmin} H(f) - \sum_{m=1}^{M} A'_m e^{-j2\pi f \hat{\tau}'_m} \tag{7}$$

In fact, with the support of an existing estimation result, the calibration solution for $\hat{\tau}'_m$ and $\hat{A}'_m$ may be iteratively performed until a corresponding objective function converges to an acceptable range. Finally, parameters $\hat{\tau}'_m$ and $\hat{A}'_m$ are put into formula (1) so as to calculate the desired frequency response of the downlink channel.

In an exemplary embodiment, the second downlink channel state information data set may be calculated through a joint constraint of the first downlink channel state data set and the uplink channel state data set. For example, an optimization problem for calculating the attenuation coefficient and the propagation delay of the propagation path is formulated as below $$\min\|S\|_p \quad (8)$$
$$\text{s.t } H(f)-B(f)S = 0$$

In the formula, $$\text{a complete set } B(f) = \begin{bmatrix} e^{-j2\pi f_1 \tau_1} & e^{-j2\pi f_1 \tau_2} & \cdots & e^{-j2\pi f_1 \tau_L} \\ e^{-j2\pi f_2 \tau_1} & e^{-j2\pi f_2 \tau_2} & \cdots & e^{-j2\pi f_2 \tau_L} \\ \vdots & \vdots & \ddots & \vdots \\ e^{-j2\pi f_K \tau_1} & e^{-j2\pi f_K \tau_2} & \cdots & e^{-j2\pi f_K \tau_L} \end{bmatrix}.$$

f denotes a frequency set having a size of K and including uplink subcarriers and fed back downlink subcarriers, and $\tau_l (l \in \{1, 2, \ldots, L\})$ denotes uniform sampling in a time (delay) domain; an operator $|\bullet|_p$ denotes a norm p. A non-zero term $S_l$ in S denotes the attenuation coefficient of the l-th propagation path, and the corresponding $\tau_l$ in B(f) denotes the propagation delay of the l-th transmission path. Optionally, the user determines the downlink subcarrier to be fed back according to channel parameters calculated through the downlink channel response. In an embodiment, the downlink subcarrier to be fed back is $f_{DL} = \Theta(\hat{\tau}, \hat{A})$. $\hat{\tau}$ and $\hat{A}$ denote estimation values of the propagation delay and the attenuation coefficient of the propagation path, respectively.

Figure 6:
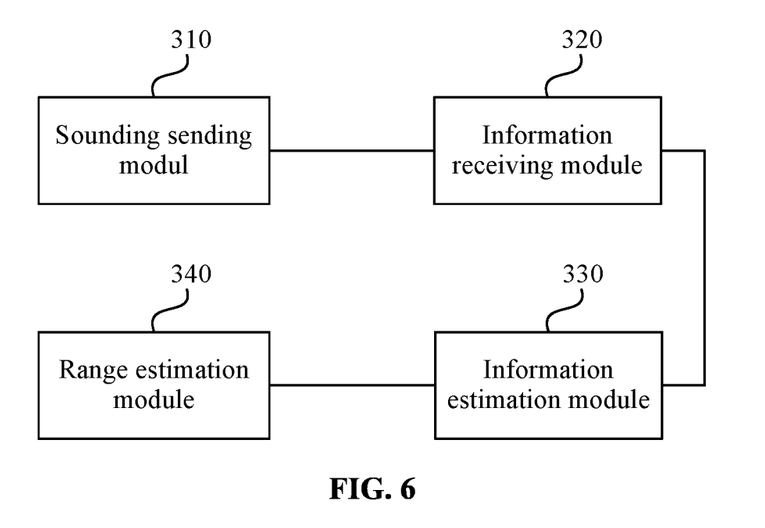
FIG. 6 is a structural diagram of a downlink channel state information estimation apparatus according to an embodiment of the present application.

FIG. 6 is a structural diagram of a downlink channel state information estimation apparatus according to an embodiment of the present application. The apparatus may perform the downlink channel state information estimation method according to any embodiment of the present application and has functional modules and effects corresponding to the executed method. The apparatus may be implemented by software and/or hardware and is generally integrated in a control node. The apparatus includes a sounding sending module 310, an information receiving module 320, an information estimation module 330, and a range estimation module 340.

The sounding sending module 310 is configured to send a downlink radio frame carrying channel sounding information.

The information receiving module 320 is configured to receive an uplink radio frame carrying a first downlink channel state information data set.

The information estimation module 330 is configured to acquire an uplink channel state information data set.

The range estimation module 340 is configured to determine a second downlink channel state information data set.

In the embodiments of the present application, the sounding sending module 310 sends the downlink radio frame carrying the channel sounding information to the user equipment, the information receiving module 320 receives the uplink radio frame including the first downlink channel state information data set, the information estimation module 330 estimates the uplink channel state information data set, and the range estimation module 340 determines the second downlink channel state information data set so that the downlink channel state information estimation in the FDD system is achieved and the feedback amount of the downlink channel state information is reduced, thereby further reducing the feedback burden of the system.

Based on the preceding embodiment of the present application, the channel sounding information in the sounding sending module 310 is a predefined sequence distributed on a predetermined transmission resource.

Based on the preceding embodiment of the present application, the first downlink channel state information data set in the information receiving module 320 includes channel state information of an estimating subcarrier and an unwrapping subcarrier.

Based on the preceding embodiment of the present application, the range estimation module 340 includes an information determination unit.

The information determination unit is configured to determine the second downlink channel state information data set by using the uplink channel state information data set and the first downlink channel state information data set.

Figure 7:
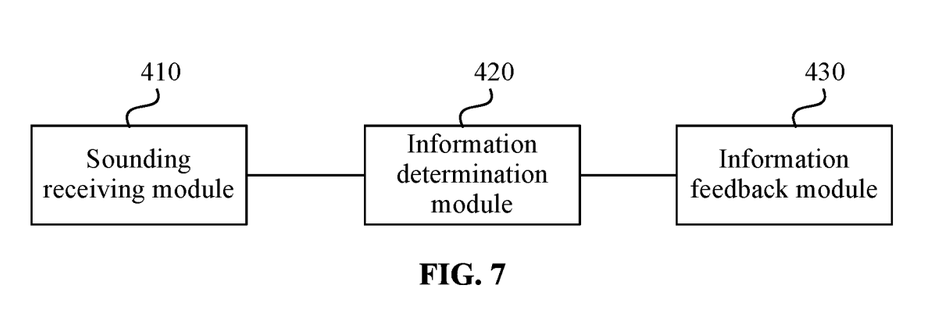
FIG. 7 is a structural diagram of a downlink channel state information estimation apparatus according to an embodiment of the present application.

FIG. 7 is a structural diagram of a downlink channel state information estimation apparatus according to an embodiment of the present application. The apparatus may perform the downlink channel state information estimation method according to any embodiment of the present application and has functional modules and effects corresponding to the executed method. The apparatus may be implemented by software and/or hardware and is generally integrated in a user equipment. The apparatus includes a sounding receiving module 410, an information determination module 420, and an information feedback module 430.

The sounding receiving module 410 is configured to receive a downlink radio frame carrying channel sounding information.

The information determination module 420 is configured to determine a first downlink channel state information data set.

The information feedback module 430 is configured to feed back an uplink radio frame carrying the first downlink channel state information data set.

In the embodiment of the present application, the sounding receiving module 410 receives the downlink radio frame carrying the channel sounding information, the information determination module 420 determines the first downlink channel state information data set, and the information feedback module 430 feeds back the uplink radio frame carrying the first downlink channel state information data set so that the feedback amount of the downlink channel state information is reduced and the feedback burden of the system is reduced.

Based on the preceding embodiment of the present application, the channel sounding information in the sounding receiving module 410 is a predefined sequence distributed on a predetermined transmission resource.

Based on the preceding embodiment of the present application, the first downlink channel state information data set in the information determination module 420 includes channel state information of an estimating subcarrier and an unwrapping subcarrier.

Based on the preceding embodiment of the present application, the information feedback module 430 includes a parameter determination unit.

The parameter determination unit is configured to estimate a propagation delay and an attenuation coefficient of a propagation path according to downlink channel frequency response.

Based on the preceding embodiment of the present application, in the information determination module 420, the number of estimating subcarriers is determined by the number of propagation paths in the channel.

Based on the preceding embodiment of the present application, in the information determination module 420, the number of unwrapping subcarriers is determined by a delay search interval.

Figure 8:
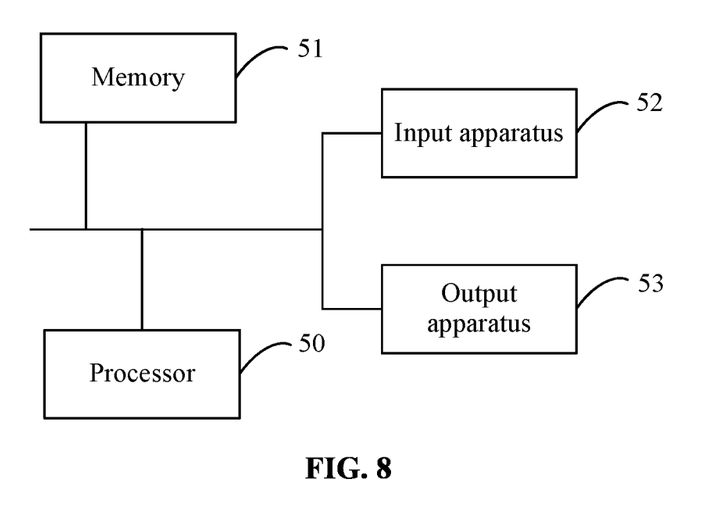
FIG. 8 is a structural diagram of a device according to an embodiment of the present application.

FIG. 8 is a structural diagram of a device according to an embodiment of the present application. As shown in FIG. 8, the device includes a processor 50, a memory 51, an input apparatus 52, and an output apparatus 53. One or more processors 50 may be disposed in the device and one processor 50 is used as an example in FIG. 8. The processor 50, the memory 51, the input apparatus 52 and the output apparatus 53 in the device may be connected via a bus or in other manners. Connecting by a bus is used as an example in FIG. 8.

As a computer-readable storage medium, the memory 51 may be configured to store software programs, computer-executable programs and modules, such as modules (for example, the sounding sending module 310, the information receiving module 320, the information estimation module 330, the range estimation module 340, the sounding receiving module 410, the information determination module 420, and the information feedback module 430) corresponding to the apparatus in the embodiments of the present application. The processor 50 executes various function applications and data processing of the device, that is, implements the downlink channel state information estimation method, by executing software programs, instructions and modules stored in the memory 51.

The memory 51 may mainly include a program storage region and a data storage region. The program storage region may store an operating system and an application program required by at least one function. The data storage region may store data created depending on the use of a terminal. Additionally, the memory 51 may include a high-speed random-access memory and may also include a nonvolatile memory such as at least one disk memory, a flash memory or another nonvolatile solid-state memory. In some examples, the memory 51 may include memories which are remotely disposed relative to the processor 50, and these remote memories may be connected to the device via a network. Examples of the preceding network include, but are not limited to, the Internet, an intranet, a local area network, a mobile communication network and a combination thereof.

The input apparatus 52 may be used for receiving inputted digital or character information and for generating key signal input related to user settings and function control of the equipment. The output apparatus 53 may include display devices such as a display screen.

An embodiment of the present application further provides a computer-readable storage medium, which is configured to store a computer program which, when executed by a computer processor, implements the downlink channel state information estimation method. The method includes the following.

A downlink radio frame carrying channel sounding information is sent; an uplink radio frame carrying a first downlink channel state information data set is received; an uplink channel state information data set is acquired; and a second downlink channel state information data set is determined.

Moreover/alternatively, a downlink radio frame carrying channel sounding information is received; a first downlink channel state information data set is determined; and an uplink radio frame carrying the first downlink channel state information data set is fed back.

In the computer-readable storage medium provided in the embodiment of the present application, computer-executable instructions implement not only the preceding method operations but also related operations in the downlink channel state information estimation method according to any embodiment of the present application.

From the preceding description of the embodiments, the present application may be implemented by means of both software and necessary general-purpose hardware, and also by means of hardware. The technical solutions of the present application may be essentially embodied in the form of a software product. The software product in a computer may be stored in a computer-readable storage medium such as a floppy disk, a read-only memory (ROM), a random-access memory (RAM), a flash memory, a hard disk or an optical disc in the computer and includes several instructions for enabling a computer device (which may be a personal computer, a server or a network device) to perform the method of the embodiments of the present application.

Units and modules involved in the embodiment of the downlink channel state information estimation apparatus are just divided according to functional logic, and the division is not limited to this, as long as the corresponding functions can be achieved. In addition, the names of each functional unit are just intended for distinguishing and are not to limit the protection scope of the embodiments of the present application.

The term user terminal encompasses any appropriate type of wireless user equipment, such as a mobile phone, a portable data processing apparatus, a portable web browser or a vehicle-mounted mobile station.

In general, multiple embodiments of the present application may be implemented in hardware or special-purpose circuits, software, logic or any combination thereof. For example, some aspects may be implemented in hardware while other aspects may be implemented in firmware or software that may be executed by a controller, a microprocessor or another computing apparatus, though the present application is not limited thereto.

The embodiments of the present application may be implemented by computer program instructions executed by a data processor of a mobile apparatus, for example, implemented in a processor entity, by hardware or by a combination of software and hardware. The computer program instructions may be assembly instructions, instruction set architecture (ISA) instructions, machine instructions, machine-related instructions, microcodes, firmware instructions, status setting data or source or object codes written in any combination of one or more programming languages.

A block diagram of any logic flow among the drawings of the present application may represent program steps, may represent interconnected logic circuits, modules and functions, or may represent a combination of program steps with logic circuits, modules and functions. A computer program may be stored in a memory. The memory may be of any type suitable for a local technical environment and may be implemented using any suitable data storage technology, such as, but not limited to, a read-only memory (ROM), a random access memory (RAM) and an optical memory apparatus and system (a digital video disc (DVD) or a compact disk (CD)). Computer-readable media may include non-transitory storage media. The data processor may be of any type suitable to the local technical environment such as, but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

What is claimed is:

1. A downlink channel state information estimation method, the method being applied to a control node, comprising:
   sending a downlink radio frame carrying channel sounding information;
   receiving an uplink radio frame carrying a first downlink channel state information data set; and
   generating a second downlink channel state information data set based on an uplink channel state information data set and the first downlink channel state information data set;
   wherein the first downlink channel state information data set is composed of channel state information related to some downlink subcarriers; and
   wherein the first downlink channel state information data set comprises channel state information of an estimating subcarrier for a coarse parameter estimation and channel state information of an unwrapping subcarrier for a refinement of the coarse parameter estimation.

2. The method of claim 1, wherein the channel sounding information is a predefined sequence on a predetermined transmission resource.

3. A non-transitory computer-readable storage medium, which stores a computer program which, when executed by a processor, implements the downlink channel state information estimation method of claim 1.

4. A downlink channel state information estimation method, the method being applied to a user equipment, comprising:
   receiving a downlink radio frame carrying channel sounding information;
   determining a first downlink channel state information data set; and
   feeding back an uplink radio frame carrying the first downlink channel state information data set;
   wherein the first downlink channel state information data set is composed of channel state information related to some downlink subcarriers;
   wherein the first downlink channel state information data set comprises channel state information of an estimating subcarrier and an unwrapping subcarrier; and
   wherein a number of unwrapping subcarriers is determined by a delay search interval.

5. The method of claim 4, wherein the channel sounding information is a predefined sequence on a predetermined transmission resource.

6. The method of claim 4, wherein determining the first downlink channel state information data set comprises:
   estimating a propagation delay and an attenuation coefficient of a propagation path according to downlink channel frequency response.

7. The method of claim 4, wherein a number of estimating subcarriers is determined by a number of channel propagation paths.

8. A device, comprising:
   at least one processor; and
   a memory configured to store at least one program,
   wherein when executed by the at least one processor, the at least one program causes the at least one processor to perform the downlink channel state information estimation method of claim 4.

9. A non-transitory computer-readable storage medium, which stores a computer program which, when executed by a processor, implements the downlink channel state information estimation method of claim 4.

10. A device, comprising:
    at least one processor; and
    a memory configured to store at least one program,
    wherein when executed by the at least one processor, the at least one program causes the at least one processor to perform the following steps:
    sending a downlink radio frame carrying channel sounding information;
    receiving an uplink radio frame carrying a first downlink channel state information data set; and
    generating a second downlink channel state information data set based on an uplink channel state information data set and the first downlink channel state information data set;
    wherein the first downlink channel state information data set is composed of channel state information related to some downlink subcarriers; and
    wherein the first downlink channel state information data set comprises channel state information of an estimating subcarrier for a coarse parameter estimation and channel state information of an unwrapping subcarrier for a refinement of the coarse parameter estimation.

* * * * *